United States Patent [19]
Goossens et al.

[11] Patent Number: 5,626,326
[45] Date of Patent: May 6, 1997

[54] SELF-SEALING VALVE ASSEMBLY

[75] Inventors: Andre F. L. Goossens, Rumst, Belgium; Helmut Weisbrod, Bad Nauheim; Ulrich Zutt, Niedernhausen, both of Germany; Antoine Rottiers, Londerzeel, Belgium; Dalibor Zaviska, Eschborn/Ts; Peter Volz, Darmstadt, both of Germany

[73] Assignee: Alfred Teves Metallwarenfabrik GmbH & Co. OHG, Germany

[21] Appl. No.: 204,167

[22] PCT Filed: Feb. 4, 1993

[86] PCT No.: PCT/EP93/00250

§ 371 Date: Oct. 6, 1994

§ 102(e) Date: Oct. 6, 1994

[87] PCT Pub. No.: WO94/01708

PCT Pub. Date: Jan. 20, 1994

[30] Foreign Application Priority Data

Jul. 4, 1992 [DE] Germany .................. 42 21 988.4

[51] Int. Cl.$^6$ .................................................. F16K 31/06
[52] U.S. Cl. ........................... 251/129.15; 29/890.13
[58] Field of Search ......................... 137/315, 454.5, 137/454.6; 251/366, 367, 317, 365, 361, 129.01; 29/888.44, 890.13, 890.124, 890.132

[56] References Cited

U.S. PATENT DOCUMENTS

| 3,442,491 | 5/1969 | Messerschmidt | 251/367 |
| 5,184,804 | 2/1993 | Shea | 137/315 X |
| 5,333,836 | 8/1994 | Fukuyo et al. | 251/129.15 |

*Primary Examiner*—Kevin Lee
*Attorney, Agent, or Firm*—Thomas N. Twomey; J. Gordon Lewis

[57] ABSTRACT

This invention relates to a valve with a valve housing which has several valve components. Sealing surfaces are provided on the circumference of the valve housing which correspond with a valve accommodating body carrying the valve housing. These surfaces are adapted to engage the valve accommodating body where (in dependence on the relative motion of the valve housing in respect of the valve accommodating body) the material volume existing on the circumference of the and plastically displace it into a circumferential recess of the valve housing.

5 Claims, 2 Drawing Sheets

SELF-SEALING VALVE ASSEMBLY

TECHNICAL FIELD

This invention relates to valves, in particular to solenoid valves.

BACKGROUND OF THE INVENTION

From German Patent Application No. P 41 41 546.9 a solenoid valve is disclosed having a valve housing of which is fastened in a sealed manner in a stepped bore of the valve accommodating body. For sealing purposes, the valve housing has two sealings which are inserted in circumferential grooves and which prevent the pressure medium from escaping from the annular chamber of the valve accommodating body. The solenoid valve is held in the valve accommodating body by means of a force which is indirectly effective on the valve housing and which, for instance, may be generated by a cover tilted over the valve. During high-pressure operation of the valve the thrust effective on the valve housing is considerable wherefore (with regard to the anchoring and structural strength) the dimensions of the cover that generate the force for holding the valve in place must be correspondingly strong.

The requirement of a specific separate sealing of the valve housing within the valve accommodating body as well as the requirement of introducing an external holding force into the valve housing are therefore to be considered important. The frictional fastening of the valve housing within the valve accommodating body by means of screwing is known as is fastening by means of positive engagement. For instance, snap rings are used to fasten the valve housing to the valve accommodating body. These measures are expensive and intricate in terms of design and assembly and require specific sealing techniques for sealing between the valve housing and the valve accommodating body. On principle, any required sealing will lead to a considerable increase in the required space which is a disadvantage because of the limited assembly conditions.

It is thus an object of this invention to provide as compact a valve as possible which is characterized by a particularly simple and operationally safe design for fastening and sealing the valve housing within the valve accommodating body.

According to this invention, this object is solved by using the relative motion of the valve housing in respect of the valve accommodating body, the material volume existing on the circumference of the one part is displaced in the form of a caulking into the recesses of the other part, which recesses are provided on the circumference.

DETAILED DESCRIPTION OF THE PREFERRED EMBODIMENTS

Figure 1:
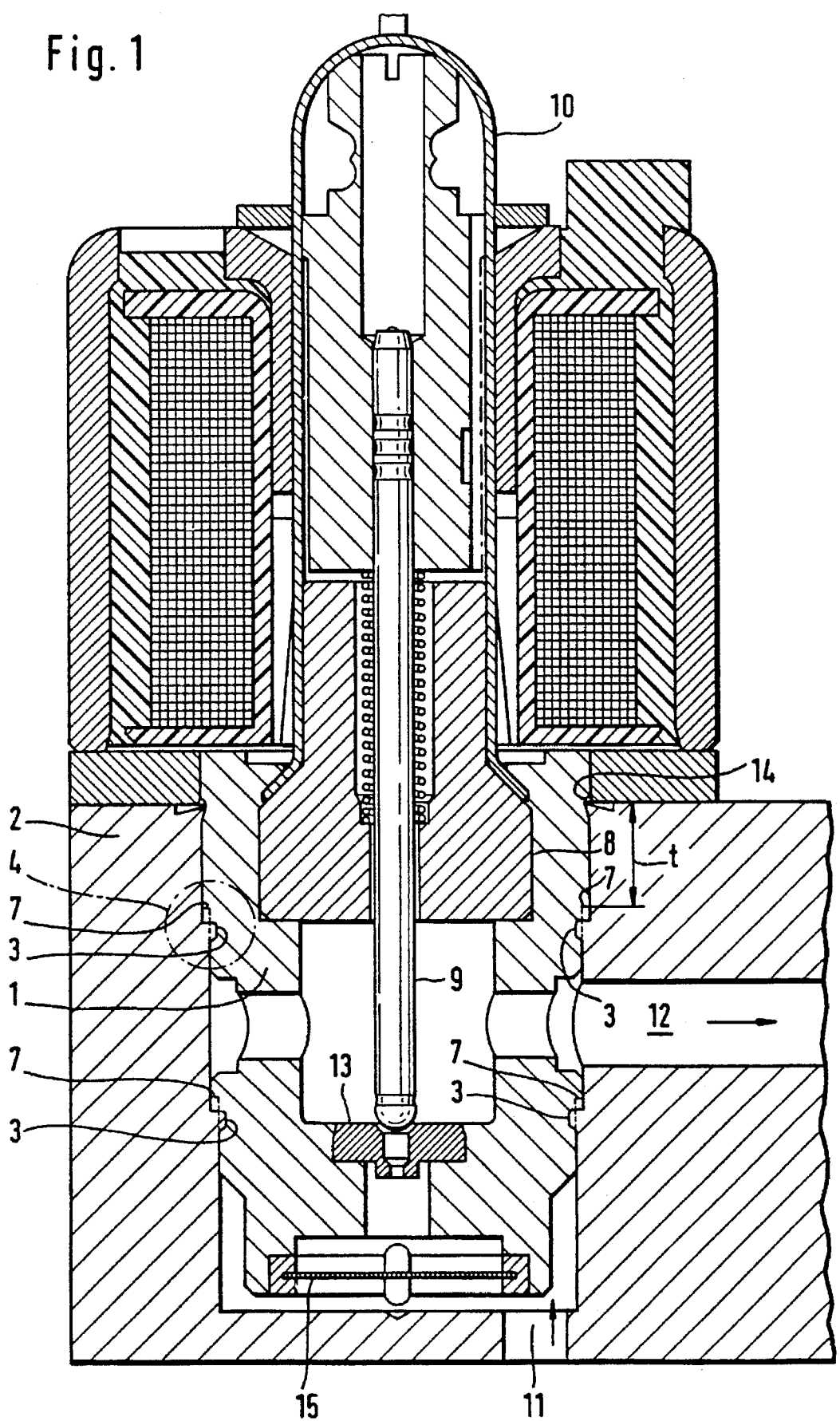
FIG. 1 is a cross-section through the solenoid valve of the present invention which, in its basic position is open when electromagnetically currentless.

In a considerably enlarged illustration, FIG. 1 shows the overall view of a solenoid valve with the inventive type of fastening of the valve housing 1 within the valve accommodating body 2. The valve housing 1 essentially is a sleeve-shaped part whose dimensions measure just a few millimeters smaller than the body 2 and which preferably is manufactured from a cold-drawn material and has a material structure which is harder relative to that one of the valve accommodating body. The valve accommodating body 2 preferably made of an aluminum alloy is correspondingly less hard than the valve housing 1 made out of automatic steel, for instance. This difference in hardness is important for the essentially positive fastening of the valve housing 1 within the valve accommodating body 2. A constructionally expedient feature are the recesses 3 on the valve housing 1 which are designed as surrounding annular grooves arranged on the diameter-stepped surface area of the valve housing 1. Recesses 3, disposed between adjacent large diameter portions 16 and small diameter portions 17, are smaller in diameter than the small diameter portion 17. As the valve housing is forced deeper into the accommodating body during an axial caulking stroke, the relatively soft material volume of the valve accommodating body 2 displaced by the large diameter portion flows (plastically deforms) into the recesses 3 forming a surrounding cam or ring. Thus, the valve housing 1 (because of its diameter stepping which diminishes in diameter in the jointing direction) takes over the function of a caulking stamp which a large diameter portion 18 and a small diameter portion 19 of the diameter of the stepped bore of the valve accommodating body 2 is adapted to. The original depth t of the large diameter portion 18 of bore step 7 within the valve accommodating body 2 Depth t is less than a distance the large diameter portion 16 of the valve housing extends into the valve accommodating body 2 when valve housing 1 is fully installed in the body 2 by the required caulking stroke of the caulking stamp (or the valve housing 1). The caulking stroke is determined by calculating the axial displacement of the house 1 corresponding to the volume of aluminum alloy to be displaced in the jointing direction into the recess 3.

The sleeve-shaped valve housing 1 accommodates the pressure medium passage bores 11, 12 to be controlled by the valve tappet 9, as well as the magnet core 8, the valve sleeve 10, the valve seat 13 and a plate filter 15. To ensure a safe sealing of the valve housing 1 within the valve accommodating body 2, in correspondence with the drawing, the pressure medium passage bore 12 (designed as a cross channel) is provided with a surrounding caulking spot 4 above and below the channel guideway. So, on the one hand, with the valve tappet 9 closed, there will be provided a circuit current and, hence, pressure compensation between the two pressure medium passage bores 11, 12 of the valve accommodating body 2. On the other hand, with the valve tappet 9 being open, the fluid which is under a high pressure will not be able to penetrate to the surface of the valve accommodating body 2 in the direction of the caulking spot which in the drawing is the upper one. Consequently, the caulking spots 4 will not only generate the holding force for fastening the solenoid valve within the valve accommodating body 2 but they will also guarantee the sealing of the hydraulically applied valve components in the valve accommodating body 2.

In addition to the preceding explanations, reference is made to the further possibility of arranging a separate, (i.e., an additional sheared-in) indentation or a caulking 14 on the surface of the valve accommodating body 2 by means of a tool. In the represented example of an embodiment, the valve sleeve 10 and the magnet core 8 are fastened to the valve housing 1 by means of an external caulking.

Figure 2:
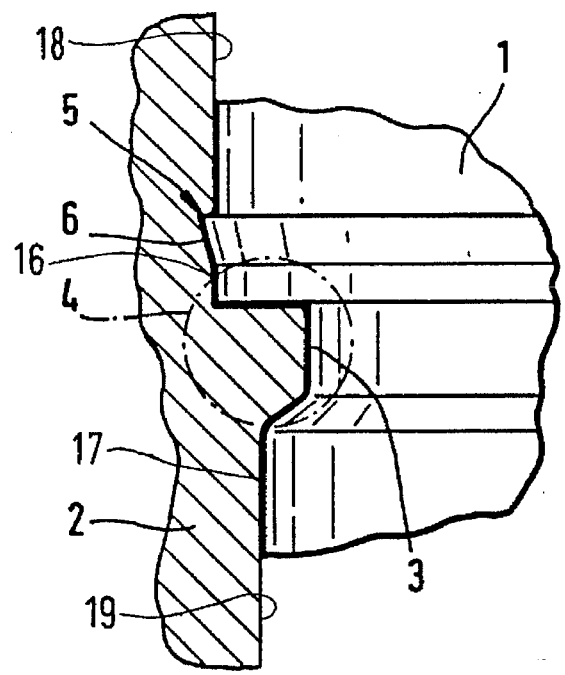
FIG. 2 is the sketch of a second embodiment of the valve housing of FIG. 1.

Now referring to FIG. 2, a second embodiment of the invention of FIG. 1 is shown. In correspondence therewith a surrounding saw-tooth-like projection 5 on the circumference of the valve housing 1 is provided, for instance, in the form of a knife edge arranged above the caulking spot 4. Thereby, via the essentially positive connection of the caulking spots 4, an additional, essentially frictional claw-type engagement of projection 5 will be achieved which will be effective contrary to the direction of pressure or force application to the joint. Thereby it will be possible to enhance the holding force, an additional sealing edge being attained at the saw-tooth-like projection 5.

Figure 3:
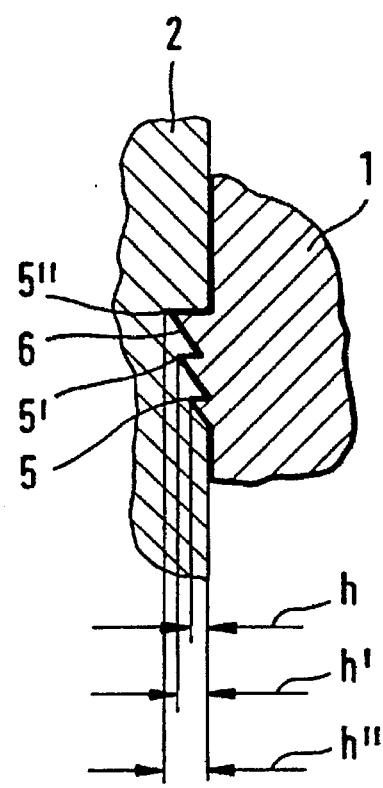
FIG. 3 on an enlarged scale, is a third embodiment of the valve housing of the present invention.

In addition to the embodiment of FIG. 2, FIG. 3, in cross-section, shows a plurality of projections 5, 5', 5" which in the drawing are arranged on top of one another, or in succession, on the circumference of the valve housing 1. In accordance with the drawing, the projections 5, 5', 5" have a knife edge height h, h', h" which increases contrary to the jointing direction, with the tooth bevel 6—beyond what is already discernible from FIG. 2—pointing in the jointing direction, i.e., into the bore of the valve accommodating body 2.

Because of the corresponding designs of the projections 5, 5', 5" it will be possible to do without the surrounding caulking point 4 arranged approximately on the level of the magnet core 8 if this is permitted by the rating of the operating pressures.

Because of the automatic shearing-in type of connection of the valve accommodating body 2 with the valve housing 1 which in particular can be discerned from FIG. 1, it is in a surprisingly simple manner possible to fasten a completely pre-assembled valve unit undetachably within the valve accommodating body 2 in one operation by means of an easily accomplishable push-in movement without any additionally required sealing measures and fastening means. The valve housing 1 moreover can be designed extremely small by virtue of the absence of separate sealings so that the space requirements become a minimum both for the valve housing 1 and for the valve accommodating body 2.

There exist further applications of this invention with all valve means having valve housings. In this respect, exemplary reference is made to pressure and current control valves, pressure relief valves as well as to non-return valves, irrespective of whether they are seat-type and/or slide-type valve versions.

I claim:

1. A self-sealing valve assembly comprising:

a valve housing formed of a first material and having a first diameter portion and larger second diameter portion of a predetermined depth and an annular recess defining a shoulder at a transition from the first diameter to the second diameter with the annular recess having a third diameter smaller than the first diameter; and a valve accommodating body formed of a second material softer than the first material and having a bore with a first diameter portion approximately equal in diameter to the first diameter portion of the valve housing and distal to an outer surface of the valve accommodating body and the bore having a larger second diameter portion of a predetermined length and approximately equal in diameter to the second diameter portion of the valve housing and opened to the outer surface of the valve accommodating body defining a step at a transition from the first diameter portion to the second diameter portion of the valve accommodating body wherein displacement of the valve housing into the valve accommodating body by a predetermined distance after initial engagement between the shoulder and the step displaces a volume of the second material approximately equal to a volume of the annular recess into the annular recess.

2. A self-sealing valve assembly as claimed in claim 1 wherein a radial projection extends from one of the first diameter portion and the second diameter portion and the annular recess of the valve housing and is engaged by the second material.

3. A self-sealing valve assembly as claimed in claim 1 wherein the valve housing has two transitions separated in a direction of insertion and having the large diameter portion of a first of the transitions closest to the outer surface of the valve accommodating body being larger than the large diameter portion at the second of the transitions with the transitions configured such that as the valve housing is displaced into the valve accommodating body, the respective annular recesses are each filled with the second material from the valve accommodating body simultaneously, thereby producing a first seal and a second seal.

4. A self-sealing valve assembly as claimed in claim 3 wherein the valve housing includes a fluid flow opening transverse to the housing and disposed between the two seals.

5. A self-sealing valve assembly as described in claim 1 wherein the annular recess is of a substantially constant diameter.

* * * * *